United States Patent [19]

Griffith et al.

[11] 4,442,058

[45] Apr. 10, 1984

[54] ESTERIFICATION OF CARBOXYL END GROUPS EMPLOYING ADDITION OF OXIRANE COMPOUNDS

[75] Inventors: Ronald L. Griffith, Charlotte, N.C.; Nicolai A. Favstritsky, Broomall, Pa.

[73] Assignee: Fiber Industries, Inc., Charlotte, N.C.

[21] Appl. No.: 510,781

[22] Filed: Jul. 5, 1983

Related U.S. Application Data

[63] Continuation of Ser. No. 416,731, Sep. 10, 1982, abandoned, which is a continuation-in-part of Ser. No. 170,339, Jul. 21, 1980, abandoned, which is a continuation-in-part of Ser. No. 913,417, Jun. 7, 1978, abandoned.

[51] Int. Cl.$^3$ ................................................ D01F 1/00
[52] U.S. Cl. ............................ 264/176 R; 264/176 F; 264/211

[58] Field of Search ............... 264/176 R, 176 F, 211; 528/309

[56] References Cited

U.S. PATENT DOCUMENTS

| 3,627,867 | 12/1971 | Schwarz | 264/211 |
| 4,016,142 | 4/1977 | Alexander et al. | 528/309 |
| 4,071,504 | 1/1978 | Korrer | 528/309 |

FOREIGN PATENT DOCUMENTS

| 48-17559 | 5/1973 | Japan . | |
| 51-60727 | 5/1976 | Japan | 264/211 |

*Primary Examiner*—Jay H. Woo
*Attorney, Agent, or Firm*—H. M. Adrian, Jr.

[57] ABSTRACT

A method of reducing the number of free carboxyl end groups present in a fiber-forming polymer is given whereby to the polymer minor amounts of a low-boiling oxirane compound such as ethylene oxide are added.

11 Claims, No Drawings

ESTERIFICATION OF CARBOXYL END GROUPS EMPLOYING ADDITION OF OXIRANE COMPOUNDS

This application is a continuation of U.S. patent application Ser. No. 416,731 filed Sept. 10, 1982, now abandoned, which application was in turn a continuation-in-part of U.S. patent application Ser. No. 170,339 filed July 21, 1980, now abandoned, which in turn was a continuation-in-part of U.S. patent application Ser. No. 913,417 filed June 7, 1978, now abandoned.

This invention relates to the preparation of filamentary materials from linear condensation polymers. This invention relates further to synthetic linear polyester filaments, yarns, and cords useful as industrial fibers which show improved strength retention when exposed to hydrolytic conditions or when sealed in a rubber and exposed to elevated temperatures. More particularly, the invention relates to a process whereby the free carboxyl end group concentration of synthetic linear polyesters may be reduced to a low level while producing yarns having good tensile properties.

Terephthalate polyesters such as those disclosed by U.S. Pat. No. 2,465,319 are produced in significant quantities for a variety of commercial products. Polyethylene terephthalate, one of the better known terephthalate polyesters, is a reaction product of terephthalic acid and ethylene glycol and is produced having a high degree of polymerization forming long linear polymer chains whch normally terminate with either a carboxyl end group or a hydroxyl end group. The melt-spinning of high molecular weight polyethylene terephthalate has been successfully employed to produce fibers possessing properties suitable for use in reinforcing rubber articles including pneumatic tires.

In U.S. Pat. No. 3,051,212 which issued to Daniels, it is disclosed that when rubber articles such as tires, belting, and the like are reinforced with fibers or cords comprising synthetic linear polyester, these fibers or cords show superior strength retention during exposure to high operating temperatures when the free carboxyl end group concentration of the polyester which comprises the cords is reduced to less than 15 equivalents per million grams. It has also been observed that there appears to be a correlation between the resistance of linear polyesters of a given carboxyl end group concentration to high running temperatures in rubber and their resistance to hydrolytic conditions which may be encountered within hot rubber structures.

The usual commercial synthetic polyester fabrics generally have a free carboxyl group concentration of from about 30 to about 60 or more equivalents per million grams. When such structures having this high carboxyl group concentration are exposed to high operating temperatures under hydrolytic conditions, excessive loss of strength is observed. This strength loss is particularly evident with filaments used as reinforcing cords or fabrics in pneumatic tires which normally are expected to operate at high temperatures caused by high speeds and heavy loads in a safe manner.

Thus, low free carboxyl end group concentrations are highly desirable because it is believed to reduce degradation of the fiber. Alexander et al in U.S. Pat. No. 4,016,142 disclose one satisfactory technique for reducing the free carboxyl end groups by modifying the polyester with small amounts of a glycidyl ether which react with the carboxyl end groups present to form free hydroxy end groups.

In U.S. Pat. No. 3,216,187 issued to Chantry et al, it is noted that higher viscosity polymers produce substantially corresponding higher fiber strength. But in the manufacture of high performance fibers following this observation, it is necessary to melt-spin polyethylene terephthalate of an unusually high molecular weight which is much more viscous than that used in making ordinary textile fibers. One of the problems accompanying the production of such high-molecular-weight fibers is the difficulty of handling the highly viscous polymer in pipelines, spinning pumps, filters, spinnerets and the like. The melt viscosity at 304° C. of polyethylene terephthalate is more than 10 times that of 6-6 nylon when the two polymers have the same relative viscosity. It is known that the melt viscosity of high-molecular-weight polymers may be reduced by raising the temperature of the polymer or by adding a plasticizing agent, but higher temperatures are known to cause polymer degradation, and plasticizers which remain in the fiber are found to cause changes in fiber properties and performance which are considered undesirable. Highly volatile plasticizing agents which would appear desirable and effective, generally have been unsatisfactory producing a bubble-filled fiber.

Schwarz in U.S. Pat. No. 3,627,867 proposes the use of low boiling oxirane compounds or plasticizers in amounts of as low as 0.25 to about 10 percent to provide substantial reduction in filter pack pressure in the melt spinning of high molecular weight polyethylene terephthalate. Thus it appears possible to use higher viscosity polyethylene terephthalate polymer to produce the desired higher strength fibers without apparent compromise with fiber quality and integrity.

It is the object of this invention to provide an improved process for controlling and reducing the concentration of free carboxyl end groups in synthetic linear polyesters. A further object of this invention is to provide an improved process whereby the free carboxyl end groups in synthetic linear polyesters may be converted into esters containing active hydroxyl end groups which may be capable of further reaction to produce higher molecular weight molecules. A still further object of this invention is to provide a process whereby a modified synthetic condensation polyester polymer of higher molecular weight may be obtained than has heretofore been possible in a conventional polymerization process. Conversely, the process of this invention can produce polyester polymer at a given molecular weight in larger quantities than by conventional means. Yet a further object of this invention is to provide a technique for producing high strength fibers. Another object of this invention is to provide for drawn yarn having high tensile properties. Other objects of the invention will become apparent from a full reading and consideration of the ensuing specification.

As used herein "synthetic linear polyesters" mean film-forming or fiber-forming condensation products of dicarboxylic acids such as terephthalic acid and glycols of the series $HO(CH_2)_n OH$ where n is an integer from 2 to 10. The most important example of this class of polyesters is polyethylene terephthalate which may be prepared by a number of well known processes. For use as reinforcing elements in rubber structures, melt-spun filaments of polyethene terephthalate are drawn to about 3.5 to about 7.0 times their length after melt spinning, twisted into yarns and plied into cords or woven into fabrics. The cords or fabrics are then treated with adhesive and bonded against or into the rubber structures.

Synthetic linear polyester yarns or cords made by known means can be shown to contain a free carboxyl end group concentration of from 30 to 60 or more equivalents per million grams. By "free carboxyl end groups" are meant the acid group,

the concentration of which may be determined by Pohl's Method as described in Analytical Chemistry, Vol. 26, page 1614, October 1954. The formation of such free carboxyl end groups results as a natural consequence of the processes normally employed in the production of linear polyester polymers.

Known synthetic linear polyester yarns or cords for use as rubber structure reinforcing elements are preferably made from a polymer having an intrinsic viscosity of from 0.75 to 1.0 or higher. Whereas synthetic linear polyester filaments used in textile products normally have an intrinsic viscosity of the polymer of from 0.35 to 0.66, these filaments are less suitable as rubber reinforcing elements since they are comparatively weak at a given extension level and fatigue to rupture with relatively little flexing. Filaments made from higher intrinsic viscosity synthetic linear polyester are stronger and less susceptible to such flexing fatigue. It has been found, however, that in the production of a polymer of a high intrinsic viscosity by the normal method of extending the polymerization period, an increase in free carboxyl group concentration results. Thus, while a high intrinsic viscosity polymer may be produced to overcome the problem of filament strength and flexing fatigue, at the same time the added carboxyl end group content results in an increase in the amount of strength lost when the filaments are exposed to high temperatures under hydrolytic conditions in rubber.

By the phrase "intrinsic viscosity" sometimes denominated IV, it is meant to describe the reduced viscosity of the polymer at zero concentration, which may be determined by measuring the flow times of a polymer solution after successive dilutions with fresh solvent, calculating the reduced viscosities, and extrapolating a plot of the reduced viscosities against concentration to zero concentration. The reduced viscosity is obtained from the expression:

$$\frac{\text{Flow time of polymer solution}}{\text{Flow time of solvent}} - 1 \times \frac{1}{c}$$

where c is the concentration expressed as grams of polymer per 100 ml. of solvent. As used herein, the intrinsic viscosity was measured at 25° C., using orthochlorophenol as a solvent in a modified Ostwald viscometer.

The novel process of this invention whereby the intrinsic viscosity of the polymer is increased and the number of free carboxyl end groups present in the polymer may be substantially reduced comprises adding to a synthetic polyester, as hereinabove defined, a minor amount of a highly volatile oxirane compound which is believed to modify the polyester by reacting with the carboxyl end groups present in the polyester molecule to form esters containing free hydroxyl end groups. Such molecules may then react further to produce higher molecular weight molecules. The improved process of the invention, therefore, comprises the steps of reacting the reaction product of (A) polyesters formed by the reaction of at least one dicarboxylic acid and at least one glycol of the series $HO(CH_2)_nOH$ wherein n is an integer from 2 to 10, such a polyester having in the molecule a terminal carboxyl group, and (B) a minor amount of highly volatile oxirane compound of the formula:

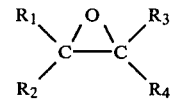

wherein $R_1$, $R_2$, $R_3$ and $R_4$ may be hydrogen or alkyl substitutes.

The addition of polyesters or their constituents with small amounts of the above mentioned oxiranes and the resultant novel synthetic polyester reaction product formed thereby provides a novel method for reducing the carboxyl end group content and the intrinsic viscosity of highly viscous polyethylene terephthalate. It produces an improved polyethylene terephthalate molecule wherein a carboxyl end group has been converted into an ester containing a single free hydroxyl end group, thus providing a molecule which may then react further with other molecules to produce polymers of higher molecular weight. Additionally, increased tensile strength and other desirable properties are noted with the present invention. In processes wherein the polymerization is carried on in a continuous manner, for example, by subjecting thin molten films or threadlines to polymerization conditions, the oxirane may be added to the polymerized or partially polymerized material.

In the process of this invention it has been discovered that by dispersing a highly volatile oxirane compound into a molten polyester under pressure and maintaining the molten polyester under pressure, the intrinsic viscosity of the polyester can be increased and highmolecular weight polymers may be processed in conventional equipment without the development of excessive pressures. When polymer treated with these highly volatile materials is extruded into filaments, substantially no evidence of bubble formation is found in the filaments.

This advantage of oxiranes as plasticizers with polyethylene terephthalate was disclosed by Schwarz in U.S. Pat. No. 3,627,867 which was mentioned above.

Surprisingly and unexpectedly, by modifying highly polymerized polyethylene terephthalate and its related esters with minor or very small amounts of highly volatile oxirane compounds, a significant reduction in free carboxyl end groups is achieved while uniquely a product of higher intrinsic viscosity is produced. The melt spin fibers of such processes are significantly enhanced with unexpected tensile properties over yarns not modified in accordance with the invention.

Preferably, in the process for melt-spinning highmolecular weight ethylene terephthalate polymer, the improvement of the present invention comprises raising the pressure of molten polymer above atmospheric, at for example about 100 to about 5000 psig, dispersing in the pressurized molten polymer a low-boiling oxirane compound, maintaining the molten polymer under pressure as it is transferred to a spinning machine, and meltspinning the polymer through a filter and spinneret into a lower pressure or atmospheric zone. The extruded filaments are quenched and subsequently drawn to give tenacious fibers.

Excellent results are found when the oxirane compound is mixed with the molten polyester which is under pressure for periods of at least sixty seconds and preferably from 5-20 minutes immediately prior to the polymer reaching the critical spinning elements of the extrusion operation, that is, the metering gear-pump and filter. The mixing time may be longer than 20 minutes if desired, but one should avoid unnecessary heat degradation of the polymer which may occur when times of above 30 minutes are employed.

For best results, the molten polymer should be pressurized to a pressure of at least about 1000 p.s.i.g. before the oxirane compound is injected.

The amount of oxirane compound added should be carefully controlled to achieve the advantages and results of this invention. Minor amounts of between about 0.05 to less than about 0.25 percent by weight based upon the weight of the polymer are necessary. Preferably from about 0.15 to less than about 0.25 percent should be employed in a manner to insure sufficient mixing.

The "low-boiling oxirane compound" is preferably a compound represented by the structural formula

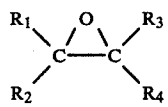

where each of $R_1$, $R_2$, $R_3$, and $R_4$ is a hydrogen or alkyl substituent.

Oxirane compounds suitable for use in the process of this invention include those having a boiling point at atmospheric pressure less than about 75° C. Ethylene oxide, 1,2-epoxypropane, 1,2-epoxybutane and 1,2-epoxy-2-methylpropane are specifically contemplated in this invention. Because of its cost and commercial availability, ethylene oxide is preferred. Also, the addition of ethylene oxide to polyethylene terephthalate polymer leaves it structurally pure, which does not subsequently interfere with the crystalizing habit of the polymer.

As mentioned earlier, this invention contains a finding heretofore not recognized by the prior art, namely, that by modifying polyethylene terephthalates and related polyesters with ethylene oxide and similar highly volatile oxiranes, melt spun fibers of higher tensile strength, higher intrinsic viscosity and lower free carboxyl end group concentration may be produced. This finding is surprising since the prior art teaching of Schwarz in using higher amounts of ethylene oxide as a plasticizer rendering a mixture of lower processing viscosity would not suggest and did not demonstrate that the enhanced properties found by this invention could exist. One would not normally use less plasticizer than Schwarz suggested since smaller amounts would fail to produce the desired plasticizing effect.

The following examples illustrate the present invention but these examples should in no manner serve to limit the scope of this invention to the embodiments described. All parts and percentages are by weight unless otherwise stated.

EXAMPLE 1

(a) Preparation of Control Sample

A quantity of a standard polyethylene terephthalate polymer was prepared according to the following procedure. 1550 g. of dimethyl terephthalate and 1100 ml. of ethylene glycol were placed in a distillation flask fitted with a reflux column. The mixture was heated to 160° C. and 0.015 percent by weight of zinc acetate dihydrate was added as an ester interchange catalyst. The ester interchange reaction was continued until 640 ml. of methanol had been evolved and collected. 0.04 percent by weight of antimony trioxide as polycondensation catalyst was added together with 0.5 percent by weight of titanium dioxide as a delustrant and the batch was then transferred to an autoclave. The temperature of the batch was raised to 285° C. and the autoclave was simultaneously evacuated to a vacuum corresponding to 0.1 mm. of mercury. The polycondensation was allowed to continue until the electric power requirements of the stirrer motor indicated that a suitable molecular weight had been reached. 0.64 ml of triphenyl phosphite was added to the batch as a stabilizer and the batch stirred under nitrogen gas at atmospheric pressure for 60 minutes. The batch was then extruded in ribbon form from the autoclave and the solidified polymer cut into cubes. Upon examination, the polymer was shown to have an intrinsic viscosity of 0.63, a softening point of 262.2° C. and a free carboxyl end group concentration of 32.6 equivalents per million grams of polymer.

(b) Use of 1,2-Epoxy-2-Methylpropane

A polymer batch was prepared under the conditions outlined above. At the end of the polymerization period a sufficient amount of 1,2-epoxy-2-methylpropane was added to the melt to give 0.24% by weight 1,2-epoxy-2-methylpropane in the polymer and the melt stirred for ten minutes under dry nitrogen at atmospheric pressure. The autoclave was then evacuated and the batch extruded in ribbon form. Examination of the polymer showed the intrinsic viscosity increased and the free carboxyl end group concentration significantly reduced.

(c) Use of 1,2-Epoxypropane

A polymer batch was prepared under the conditions listed above. At the end of the polymerization period the autoclave was pressurized to 30 p.s.i.g. with dry nitrogen and 0.15% 1,2-epoxypropane based upon the weight of the polymer was added to the melt. After twenty minutes stirring under pressure, the autoclave was evacuated to remove excess epoxide and the batch extruded in the form of a ribbon. Upon examination, the polymer was found to have an intrinsic viscosity and a free carboxyl end group concentration values similar to the improved values noted with 1,2-epoxy-2-methylpropane.

EXAMPLE 2

The polymers from Example 1 were converted into 75 denier 33 filament yarns using techniques familiar to those skilled in the art. Tire cord samples were prepared by plying together 28 ends of each 75 denier 33 filament yarn. Six samples of each of the plied yarns were exposed to hydrolytic conditions in steam at 15 p.s.i.g. and 120° C. for 72 hours, and six samples were retained unexposed to the steam to determine the initial strength.

After exposure, the strength loss of each sample was measured by means of an Instron tensile tester using a cross head speed of 20 cm./min., and a sample length of 20 cm. From the results obtained it could be seen that the percentage strength retention after exposure to hydrolytic conditions bears a direct relationship to the free carboxyl end group concentration of the polymer.

EXAMPLE 3

A mixture consisting of 1300 lbs. dimethyl terephthalate, 95 gallons ethylene glycol, 100 g. zinc acetate dihydrate, and 1.04 lbs. antimony trioxide was placed in an autoclave fitted with a side arm condenser. The batch was heated to 160° C. at which point transesterification took place and methanol distilled off. The batch temperature was raised slowly to 190° C. at which point the theoretical quantity of methanol had been distilled off. The monomer/glycol solution obtained was transferred to a second autoclave and 5.0 lbs. of titanium dioxide added as a slurry in glycol. The temperature of the batch was raised to allow excess glycol to distill off. The autoclave was then evacuated and the temperature raised to 285° C. The batch was held under vacuum until the power consumption to the stirrer indicated that an intrinsic viscosity of 0.75 had been reached. At this point, the vessel was blanketed with nitrogen, 500 ml. triphenyl phosphite stabilizer and 2.0 Kg. 1,2-epoxy-2-methylpropane added. The nitrogen pressure inside the autoclave was raised to 15 p.s.i.g. and the batch stirred for 10 minutes. Vacuum was reapplied and maintained until the pressure inside the autoclave dropped to 0.2 mm. of mercury. The batch was then extruded. The resulting polymer was found to have good intrinsic viscosity, and a softening point of 254° C. The carboxyl end group content was measured as less than 20 equiv./$10^6$ g.

This polymer was converted into an 1100 denier yarn using techniques familiar to those skilled in the art. This process increased the carboxyl end group content slightly. Three ends of this yarn were twisted individually to a twist level of 10 t.p.i. "Z", and the resulting yarns three plied to a twist level of 10 t.p.i. "S". This is a common polyester tire cord construction. This cord was adhesive and heat treated in a manner commonly used to prepare polyester tire cords. The composition of the adhesive used is described by R. G. Aitken et al in Rubber World, February 1965. A drying temperature of 200° F. was used to dry the adhesive, and subsequently the cord was heat treated at 475° C. The cord was held to length during this application. Treated cord samples for comparison were made up in an identical manner except that the polymer from which these cords were made was not modified by the addition of 1,2-epoxy-2-methylpropane to the polymer melt. The carboxyl end group content of this control yarn was determined as 53 equiv./$10^6$ g.

Both treated cord samples were bonded into black rubber of a type which is used in the carcass of passenger car tires and the resulting vulcanized assemblies were held at 150° C. for 24 hours. The cords were subsequently removed and tested. It was found that the cord made from control polymer had lost almost one-third of its strength, compared with about a ten percent strength loss in the 1,2-epoxy-2-methylpropane treated sample.

EXAMPLE 4

Polyethylene terephthalate was produced in a continuous manner by supplying a continuous feed of terephthalic acid and ethylene glycol to a heated esterifying vessel. Direct esterification of the terephthalic acid took place in this vessel and the resulting prepolymer was fed together with 0.08% of antimony oxide catalyst through a series of other vessels in which the temperature of the contents was raised to 295° C. and the pressure reduced. Polycondensation occurred within these vessels with the removal of ethylene glycol. At the termination of the series of vessels the polymer had reached an intrinsic viscosity of 0.89 whereupon it was cut and diced and retained for use in further experiments.

The polymer was dried in a batch dryer and fed to the hopper of a Waldron Hartig 1½" extruder where the polymer was melted and brought to a temperature of 295° C. The extruder generated a pressure of 1200 p.s.i.g. in the polymer at its exit which forwarded the polymer through a static mixer and to a metering pump. This pump controlled the polymer flow rate and forced the polymer through a spinning pack. The static mixer, meter pump and spinning pack were maintained at 295° C. by a Dowtherm condensing system.

Immediately following spinning the extruded filaments passed through a cylindrical shroud heated to a temperature of 300° C. Below this shroud the spinning filaments were quenched in air and were taken to a roll set running at 1000 ft/min. The spun yarn was then passed over several more sets of rolls which imposed a conventional two stage hot roll drawing operation on the threadline.

Introduction of Ethylene Oxide

The spinning process was run in the same manner, with the exception that a steady flow of ethylene oxide was pumped into the polymer stream at the discharge end of the extruder. Injection of the ethylene oxide was accomplished by pumping the chilled liquid from a nitrogen blanketed reservoir, via a pair of Milton Roy variable stroke piston pumps which generated sufficient pressure to inject the additive into the pressurized melt. Following the injection the polymer/ethylene oxide mixture was intimately blended by passing through a static mixer (which was incidentally present when the control samples were made also). All subsequent spinning steps were similar to those employed for the control samples with the exception of slightly elevated changes in shroud temperature which are employed to improve the draw.

Tire yarn produced with 0.24% ethylene oxide demonstrated a carboxyl end group concentration of 5.5 and good tensile strength. These results represent significant improvement over yarns produced without the oxirane compound.

When this invention is employed, it is sometimes desirable to raise the spinning shroud temperature of from 10% to about 30% relative to the Celcius temperature scale to facilitate the process. Thus, when ethylene oxide is employed at levels of from 0.05 to less than 0.25 percent by weight of polymer, it may be desirable to raise the spinning shroud temperature from about 300° C. to about 380° C. so that the modified polymer may be drawn at substantially normal draw ratios.

EXAMPLE 5

Using the process of Example 4, six separate samples of polyethylene terephthalate were prepared, five were modified by incorporation of ethylene oxdide. By evaluating the samples in the normal and above mentioned manners, the following results were obtained:

| Serial | Ethylene Oxide Level | Spinning Thread Line | Spun Yarn Intrinsic Viscosity (dl/g.) | Spun Yard CEG Level (equiv./$10^6$ g) | Drawn Yard Tenacity (g/d) | Breaking Elongation |
|---|---|---|---|---|---|---|
| 1262-23-A | None | Continuous | 0.82 | 41 | 8.71 | 11.6% |
| 1262-23-C | 0.19 | Continuous | 0.87 | 11 | 9.22 | 11.5 |
| 1262-45-G | 0.23 | Continuous | 0.88 | 12* | 9.24 | 11.2 |
| 1262-22-A1 | 0.33 | Continuous | N/A | N/A | Not Drawable | Not Drawable |
| 1145-82-E/F | 0.44 | Continuous | 0.90 | 6 | Drawing not Attempted | |
| 1145-82-E | 0.63 | Discontinuous (Bubbles) | 0.90 | 4 | N/A | N/A |

In other similar work the mean level of carboxyl end group at the ethylene oxide level of 0.23 was about 10.

It was noted in the above table that addition of ethylene oxide at the 0.19% and the 0.23% levels resulted in improvements in drawn yarn tensile properties, increases in spun yarn intrinsic viscosity, and decreases in carboxyl end group level. Additive levels of 0.33 and higher secured increases in intrinsic viscosity and also reductions in carboxyl end group levels; however, high strength drawn yarns could not be produced in an integrated polymer modification and spinning process. It should also be noted that changes in intrinsic viscosity of 0.01 and greater are considered significant.

In this invention, particularly advantageous results are obtained when the instant invention is used in the processing of polyethylene terephthalate having a molecular weight high enough to give an intrinsic viscosity of 0.65 or higher.

While this invention has been described in terms of specific embodiments, it is not so limited, and the invention should be viewed with respect to the appended claims.

What is claimed is:

1. A method of improving the intrinsic viscosity and reducing the carboxyl end group concentration in melt spun fibers of high-molecular weight polyester polymers comprising adding to the molten linear condensation polymer and reacting therewith in the molten state from about 0.05 to less than 0.25 percent, by weight based on the weight of polymer, of an oxirane compound selected from the group consisting of ethylene oxide; 1,2-epoxypropane; 1,2-epoxybutane; and 1,2-epoxy-2methylpropane, said oxirane compound being added to said polymer 1 to 30 minutes prior to the polymer extrusion operation.

2. The method of claim 1 wherein the oxirane compound is added to the polymer 1 to 20 minutes prior to the polymer spinning operation.

3. The method of claim 2 wherein said oxirane compound is ethylene oxide.

4. The method of claim 1 wherein the polyester polymer is polyethylene terephthalate.

5. The method of claim 1 wherein the polymer is extruded and formed into chips.

6. The method of claim 1 wherein the polymer is extruded into a fiber.

7. A method of melt spinning fibers of high molecular weight polyethylene terephthalate polymers to increase intrinsic viscosity and lower free carboxyl end group concerntration comprising admixing and reacting with molten polyethylene terephyhalate polymer from about 0.05 to less than about 0.25 percent based upon the weight of the polymer of a low boiling oxirane compound, forcing the oxirane-containing molten polymer under pressure to a spinneret after admixing and reacting for 1 to about 30 minutes, and extruding the oxirane reacted polymer into a zone of lower pressure and temperature to form a fiber.

8. The method of claim 7 wherein the amount of oxirane compound reacted with the polymer is from 0.15 to less than 0.25 percent by weight based on the weight of polymer.

9. The method of claim 7 wherein the ethylene terephthalate polymer has a relative viscosity of at least 50 when determined as a 10 percent solution in a mixture of 10 parts phenol and 7 parts 2,4,6-trichlorophenol by weight at 25° C.

10. The method of claim 7 wherein the oxirane compound is added to the polymer 5 to 20 minutes before the polymer is extruded as a fiber.

11. The method of claim 7 wherein said oxirane compound is selected from the group consisting of ethylene oxide, 1,2-epoxypropane, 1,2-epoxybutane, and 1,2-epoxy-2-methylpropane.

* * * * *